United States Patent
Cathrine et al.

(10) Patent No.: US 12,554,646 B2
(45) Date of Patent: Feb. 17, 2026

(54) PREFETCH TRAINING CIRCUITRY

(71) Applicant: Arm Limited, Cambridge (GB)

(72) Inventors: Damien Matthieu Valentin Cathrine, Mougins (FR); Ugo Castorina, Antibes (FR); Marco Coletta, Antibes (FR); Diogo Augusto Pereira Marques, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/423,883

(22) Filed: Jan. 26, 2024

(65) Prior Publication Data
US 2025/0245157 A1 Jul. 31, 2025

(51) Int. Cl.
*G06F 12/0862* (2016.01)
*G06F 12/0877* (2016.01)

(52) U.S. Cl.
CPC ...... *G06F 12/0862* (2013.01); *G06F 12/0877* (2013.01)

(58) Field of Classification Search
None
See application file for complete search history.

(56) References Cited

U.S. PATENT DOCUMENTS

| | | | | |
|---|---|---|---|---|
| 6,734,538 | B1 * | 5/2004 | Sturcken | H01L 25/0657 438/455 |
| 2009/0019229 | A1 * | 1/2009 | Morrow | G06F 12/0862 711/137 |
| 2013/0013867 | A1 * | 1/2013 | Manne | G06F 12/0862 711/137 |
| 2015/0278100 | A1 * | 10/2015 | Sundaram | G06F 9/3836 711/137 |
| 2018/0157591 | A1 * | 6/2018 | Wilkerson | G06F 12/0862 |
| 2019/0361811 | A1 * | 11/2019 | Saeki | G06N 7/00 |
| 2021/0157730 | A1 * | 5/2021 | Hornung | G06F 12/0862 |
| 2022/0100664 | A1 * | 3/2022 | Ahmad | G06F 12/0811 |
| 2024/0111676 | A1 * | 4/2024 | Kalamatianos | G06F 9/30047 |

* cited by examiner

*Primary Examiner* — Yaima Rigol
(74) *Attorney, Agent, or Firm* — NIXON & VANDERHYE P.C.

(57) ABSTRACT

There is provided an apparatus, a system, a chip containing product, a method, and a medium. The apparatus comprises prefetch training circuitry to monitor memory access operations and generate training data based on the monitored memory access operations. The apparatus comprises control circuitry to determine an operational mode for the prefetch training circuitry from at least one online mode in which the prefetch training circuitry is configured to generate the training data and an offline mode in which the prefetch training circuitry is prevented from generating the training data. The control circuitry is configured to determine a memory access metric. The control circuitry is configured, when the memory access metric meets a predefined condition, to cause the prefetch training circuitry to operate in the online mode, and when the memory access metric does not meet the predefined condition, to cause the prefetch training circuitry to operate in the offline mode.

18 Claims, 7 Drawing Sheets

PREFETCH TRAINING CIRCUITRY

TECHNICAL FIELD

The present invention relates to data processing. Furthermore, the present invention relates to an apparatus, a system, a chip containing product, a method, and a non-transitory computer-readable medium.

BACKGROUND

Some apparatuses are provided with prefetch training circuitry to generate training data based on monitored memory access requests. The prefetch training data is suitable to be used for generation of prefetch requests to prefetch data into local storage circuitry in advance of a demand request for the data by processing circuitry.

SUMMARY

According to a first aspect of the present techniques there is provided an apparatus comprising:
  prefetch training circuitry configured to monitor memory access operations and to generate training data based on the monitored memory access operations, wherein the training data is suitable to be used for generation of prefetch requests to prefetch data into local storage circuitry in advance of a demand request for the data by processing circuitry; and
  control circuitry configured to determine an operational mode for the prefetch training circuitry from a plurality of operational modes comprising at least one online mode in which the prefetch training circuitry is configured to generate the training data and an offline mode in which the prefetch training circuitry is prevented from generating the training data,
  wherein the control circuitry is configured:
  to determine a memory access metric;
  when the memory access metric meets a predefined condition, to cause the prefetch training circuitry to operate in the online mode; and
  when the memory access metric does not meet the predefined condition, to cause the prefetch training circuitry to operate in the offline mode.

According to a second aspect of the present techniques there is provided a system comprising:
  the apparatus of the first aspect, implemented in at least one packaged chip;
  at least one system component; and
  a board,
  wherein the at least one packaged chip and the at least one system component are assembled on the board.

According to a third aspect of the present techniques there is provided a chip-containing product comprising the system of the second aspect assembled on a further board with at least one other product component.

According to a fourth aspect of the present techniques there is provided a method comprising:
  with prefetch training circuitry. monitoring memory access operations and generating training data based on the monitored memory access operations, wherein the training data is suitable to be used for generation of prefetch requests to prefetch data into local storage circuitry in advance of a demand request for the data by processing circuitry; and
  determining a memory access metric;
  determining an operational mode for the prefetch training circuitry from a plurality of operational modes comprising at least one online mode in which the prefetch training circuitry is configured to generate the training data and an offline mode in which the prefetch training circuitry is prevented from generating the training data;
  when the memory access metric meets a predefined condition, causing the prefetch training circuitry to operate in the online mode; and
  when the memory access metric does not meet the predefined condition, causing the prefetch training circuitry to operate in the offline mode.

According to a fifth aspect of the present techniques there is provided a non-transitory computer-readable medium to store computer-readable code for fabrication of an apparatus comprising:
  an apparatus comprising:
  prefetch training circuitry configured to monitor memory access operations and to generate training data based on the monitored memory access operations, wherein the training data is suitable to be used for generation of prefetch requests to prefetch data into local storage circuitry in advance of a demand request for the data by processing circuitry; and
  control circuitry configured to determine an operational mode for the prefetch training circuitry from a plurality of operational modes comprising at least one online mode in which the prefetch training circuitry is configured to generate the training data and an offline mode in which the prefetch training circuitry is prevented from generating the training data,
  wherein the control circuitry is configured:
  to determine a memory access metric;
  when the memory access metric meets a predefined condition, to cause the prefetch training circuitry to operate in the online mode; and
  when the memory access metric does not meet the predefined condition, to cause the prefetch training circuitry to operate in the offline mode.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Before discussing the configurations with reference to the accompanying figures, the following description of configurations is provided.

According to some configurations of the present techniques there is provided an apparatus comprising prefetch training circuitry configured to monitor memory access operations and to generate training data based on the monitored memory access operations. The training data is suitable to be used for generation of prefetch requests to prefetch data into local storage circuitry in advance of a demand request for the data by processing circuitry. The apparatus is also provided with control circuitry configured to determine an operational mode for the prefetch training circuitry from a plurality of operational modes comprising at least one online mode in which the prefetch training circuitry is configured to generate the training data and an offline mode in which the prefetch training circuitry is prevented from generating the training data. The control circuitry is configured to determine a memory access metric. The control circuitry is also configured, when the memory access metric meets a predefined condition, to cause the prefetch training circuitry to operate in the online mode, and when the memory access metric does not meet the predefined condition, to cause the prefetch training circuitry to operate in the offline mode.

Prefetching is a speculative technique and is based on a prediction that the data is likely to be required by the processing circuitry at a future point. Based on this prediction, a prefetch request may be generated to cause data to be moved to local storage circuitry in advance of it being needed by the processing circuitry. Because the technique is speculative, there may be some workloads for which the prefetch generation circuitry is able to accurately predict the data that will be required by the processing circuitry, and there may be other workloads for which the prefetch generation circuitry is only able to predict the data with limited accuracy or for which the prefetch generation circuitry is unable to make accurate predictions. In such use cases, the prefetched data may be of limited use and the prefetch circuitry may become a non-productive drain on power and/or memory bandwidth.

Generation of training data to predict which data is likely to be useful is carried out by prefetch training circuitry and is based on monitoring (e.g., analysis) of memory access operations. The form of the monitoring and the analysis performed to determine useful prefetch requests may be dependent on the type of prefetcher and the specific patterns or memory access use cases that the prefetcher is designed for. As a result, for some types of prefetcher, useful prefetch requests cannot be generated until the prefetch training circuitry has had the opportunity to monitor a sequence of memory access operations. Furthermore, where the processing performed by the processing circuitry changes, e.g., due to a context switch or a change in instructions processed within a given context, a prefetcher running on existing training data may become less useful (e.g., less accurate) and may require further training before the prefetcher can become useful again.

Because of the constantly evolving use cases of the processing circuitry the prefetch training circuitry may constantly be monitoring memory accesses. This training may be considered to be of particular importance when the prefetcher is unable to generate useful prefetch requests due to outdated training data. In other words, even when the prefetcher is off (in a state/mode in which it is unable to generate prefetch requests), training the prefetcher may be considered to be of particular importance to ensure that when the prefetcher is switched back on (placed into a state/mode in which it can generate prefetch requests) it is able to quickly become productive. The constant monitoring of memory access by prefetch training circuitry results in the prefetch training circuitry drawing power even when the prefetcher is not generating useful prefetch data and when the prefetcher is in an offline state (i.e., the prefetcher is restricted from generating prefetch requests). The inventors have recognised that, contrary to the conventional assumption that prefetcher training should be conducted even when the prefetcher is not generating useful prefetches, there are some use cases where the prefetch training circuitry will not generate useful training data and that it may be possible to recognise such situations based on a memory access metric. For example, this may be the case when there are no memory accesses or memory access patterns of the type that the prefetch training circuitry is configured to recognise. The apparatus is provided with prefetch training circuitry that is switchable between an online mode in which training data is generated and an offline mode in which training data is not generated. The apparatus is also provided with control circuitry that is configured to determine the operational mode of the prefetch training circuitry between the online mode and the offline mode in dependence on whether a memory access metric meets a predetermined condition. By allowing the control circuitry to switch the prefetch training circuitry to the offline mode, the power consumption associated with generating the training data can be reduced resulting in an overall reduction in power consumption.

The choice of memory access metric may vary dependent on the type of prefetcher that is being used. In some configurations the memory access metric is dependent on a property of a memory access request other than a value of a target address of the memory access request. Some prefetchers operate based on observation of access patterns, e.g., observation that program instructions are targeting memory addresses separated by one or more particular amounts of memory address space (e.g., separated by one or more particular stride lengths). Alternatively, some prefetchers will operate based on observation that data retrieved from a first target memory address is used to generate a further target memory address (e.g., that there is a producer-consumer relationship between memory access requests). The training circuitry associated with such prefetchers may be based on observation of target memory addresses of those memory access requests. In contrast, the memory access metric which is used by the control circuitry to determine the operational mode of the prefetch training circuitry is based on at least one characteristic that is independent of the target address itself. Such non-address properties can be gathered from portions of a processing pipeline not directly related to processing of memory accesses (e.g. decode information on the type of instructions encountered), which may be encountered earlier in the processing pipeline.

Whilst, in the above configurations, the memory access metric may be based on one property that is independent of the target address and, in addition, may also be dependent on the target address itself. In some configurations the memory access metric is independent of the target address and is based on a different property of the memory access request. In such configurations, the memory access metric does not require any knowledge of the target address and the memory access metric can be determined without knowledge of the target address of the memory access request. As a result, the control circuitry does not need to be integrated as closely with a load/store unit of the processing circuitry and can be implemented with lower complexity circuitry than the prefetch training circuitry requiring an overall lower power consumption than operating the prefetch training circuitry in the online mode. Basing the memory access metric on a property other than the target address allows the memory access metric to be determined earlier, e.g., before the target address is known, and avoids the tracking of target addresses.

In some configurations the memory access metric depends on observation of at least one event occurring in the local storage circuitry. The local storage circuitry may be a cache, for example, an L1 data cache, or an L2 cache. The control circuitry may be configured to continually monitor for the at least one event or may be configured to monitor periodically or randomly.

In some configurations the at least one event is observed in response to a lookup in the local storage circuitry. The observation may directly relate to the lookup, alternatively, the observation may be timed to coincide with the lookup and relate to the general state of the local storage circuitry and/or data items stored therein.

In some configurations the at least one event comprises at least one of: a miss in response to a lookup in the local storage circuitry; and a hit on prefetched data in response to the lookup in the local storage circuitry. In some configurations, the control circuitry may require observation of a predefined number of occurrences of one or both of the miss in response to the lookup and the hit on prefetched data in response to the lookup for the predetermined condition to be satisfied. The predefined number of occurrences may be any value and, in some configurations, may be a single occurrence.

In addition, or as an alternative, in some configurations the memory access metric depends on embedded information in instructions executed by the processing circuitry. Information embedded in the instructions is available to the apparatus prior to execution of those instructions, and may be accessed by the control circuitry at an early stage of a processing pipeline implementing the present techniques.

In some configurations the embedded information comprises an indication of a type of the instruction. The type of instruction may be a memory access instruction, for example, a load instructions or a store instruction. The type of instruction may be a particular type of load instruction or a particular type of store instruction. In addition, the embedded information may comprise one or more characteristics of the particular type of instruction. For example, the control circuitry may analyse a stream of store instructions and/or a stream of load instructions to determine the characteristics of those instructions. In some configurations the control circuitry may be configured to determine whether a memory access instruction is a store instruction, based on information embedded in the memory access instructions. The control circuitry may then determine a percentage of stores in a given window of memory accesses (or a given program). The percentage of stores may be determined relative to a total number of memory accesses or a total number of loads. Where the percentage of stores is low (for example, below a predetermined store threshold) and/or where the store instructions are far from each other (e.g., the control circuitry detects a large number of memory access instructions that are not store instructions in between two store instructions), it may be beneficial to switch the prefetch training circuitry to operate in the offline mode. In some configurations, where a dedicated store prefetcher is provided in addition to a load prefetcher, the control circuitry may analyse load and store instructions to identify redundancy between the two prefetchers, for example, if the store prefetcher is requesting cache lines that are already prefetched by a stream of load instructions. In such a configuration, the embedded information may relate to a correspondence between a register storing the load target address and a register storing the store target address independent as to what that target address actually is.

In some configurations the indication of the type of the instruction is an indication of a potential producer instruction, wherein the potential producer instruction is a memory access instruction specifying data to be stored to the local storage circuitry satisfying one or more address criteria. Some prefetchers identify instances of a producer-consumer relationship where a first memory access operation loads (produces) an address (a producer memory access operation) that is used (consumed) by a second memory access operation (a consumer memory access operation). For such prefetchers, where there are few memory access that have the potential to be producer instructions, operating the prefetch training circuitry in the online mode may result in unnecessary power consumption. By identifying these situations early on, the prefetch training circuitry can be switched to the offline mode when there are few potential producer instructions on which the training could be accurately based and can be switched back to the online mode once the number of potential producer instructions increases.

The criteria for identifying a potential producer instruction may relate to the specific type of the memory access instruction or any embedded characteristic thereof. In some configurations the one or more address criteria comprises a size criterion requiring a size of the data to be equal to the size of an address. The size of the data being loaded may be specified by the type of the instruction, for example, as part of the instruction opcode or may be specified by a parameter embedded into the instruction. A memory access instruction specifying a size of data that corresponds to an address size (e.g., a 64-bit data value in a system using a 64-bit address format, or a 32-bit data value in a system using a 32-bit address format) may be loading an address and could be treated as a potential producer instruction regardless as to whether the data loaded is actually an address or not. Basing the one or more address criteria on the size criterion allows the control circuitry to determine situations in which there are few data values being loaded that have the potential to be addresses. For example, if a large proportion of load instructions are loading 32-bit data in a system using a 64-bit address scheme, then it is unlikely that the current set of instructions being executed comprises memory access instructions exhibiting a producer-consumer relationship and, as a result, it may be beneficial to switch prefetch training circuitry that is configured to identify such relationships to an offline state. It is emphasised that the identification of an instruction as being a potential producer is not a definitive process that is able to identify all potential producer instructions. Rather, the identification is ruling out instructions that do not meet an initial set of one or more criteria that need to be fulfilled by potential producer instructions. This approach may generate false positives where an instruction is identified as a potential producer when it is not a producer, but is unlikely to generate false negatives where an instruction is ruled out of being a potential producer when it is a producer instruction.

In some configurations the one or more address criteria comprise criteria for a base address and/or criteria for a memory address. Some memory access instructions may access a target address identified by appending an offset value to a base address. In such a case, the size of a base address may be smaller than the size of a memory address. The control circuitry may be configured to identify the one or more address criteria as being satisfied based on full memory addresses, base memory addresses, or a combination of full memory addresses and base memory addresses.

In some configurations the memory access metric is based on a format of data returned by one or more memory access instructions meeting an address format requirement. In some apparatuses processing circuitry will make use of an address format for addresses. For example, whilst a 64-bit value may be used for an address, in some configurations the address format may specify that a certain number of most significant bits take a particular value. In a 64-bit address system not all 64 bits may be used for an address and the top (most significant) 12 bits may be of a same value, e.g., all zeros for user address space and all ones for kernel address space. It would be readily apparent that to the person of ordinary skill in the art that alternative address formats may be utilised for different architectures. In the above example, the determination as to whether the address format requirement is met can be performed by identifying if the most significant 12 bits of the returned data are all of a same value. If this condition is met, then it is possible (but not certain) that the data value is an address and could therefore be potential producer data requested by a potential producer instruction. If the condition is not met, then it can be determined that the data that has been returned is not of the correct format to be an address.

The memory access metric may be determined based on identification of an individual memory access. Alternatively, in some configurations the memory access metric is based on a number of occurrences of a type of memory access meeting a threshold. In other words, the memory access metric meets the predetermined condition when the number of occurrences of memory accesses that are of a particular type meets the threshold.

In some configurations the memory access metric is calculated over a fixed number of memory accesses; the control circuitry comprises an access counter configured to count a number of memory accesses, and an access type counter configured to count the number of occurrences of a type of memory access; and the control circuitry is configured to determine if the potential producer access counter meets the threshold when the number of memory accesses is equal to the fixed number of memory accesses. Calculating the memory access metric over a window of memory accesses ensures that the operational condition of the prefetch training circuitry is determined based on the memory access metric normalised to the number of memory accesses and provides a compact implementation based on the two counters. The access counter may be provided as, for example, an 8-bit counter and the fixed number of memory accesses could be set to $2^8$. The memory access counter is incremented for each memory access and the access type counter is incremented for each memory access of a particular type. The determination as to whether access counter meets the threshold and, hence, the predetermined condition is met can be made when the access counter overflows. Alternatively, the memory access counter may be compared against a stored threshold value.

In some configurations the threshold is hardwired into the control circuitry, and/or the control circuitry comprises a register configured to store the threshold and the control circuitry is responsive to one or more processing instructions to modify the threshold. For example, the instruction set architecture may be provided with one or more architectural instructions to allow the operating system, a programmer, or a compiler to modify the threshold.

In some configurations the apparatus comprises prefetch generation circuitry configured: when the prefetch training circuitry is operating in the online mode, to generate the prefetch requests based on the training data; and when the prefetch training circuitry is operating in the offline mode, to prevent the generation of the prefetch requests. Hence, when the prefetch training circuitry is in the offline mode, the prefetch generation circuitry is also prevented from generating prefetches. Once the prefetch training circuitry is switched back to the online mode, the prefetch generation circuitry may continue generating prefetches.

In some configurations the plurality of operational modes comprises a training only mode in which the prefetch generation circuitry is prevented from generating the prefetch requests and the prefetch training circuitry is configured to generate the training data. In such configurations there are at least three operational modes: a fully offline mode in which both the prefetch generation circuitry and the prefetch training circuitry are offline, a fully online mode in which both the prefetch generation circuitry and the prefetch training circuitry are online, and the training only mode in which the prefetch training circuitry is online but the prefetch generation circuitry is offline. In some configurations there may be plural fully online modes each having a different level of prefetch throttling applied to the prefetch generation circuitry. Whilst the switching of the prefetch training circuitry between the online mode and the offline mode is based on the memory access metric, a different metric may be used to determine the operational state of the prefetch generation circuitry whilst the prefetch training circuitry is in the online mode. The different metric may be based on, for example, an accuracy of the prefetch generation circuitry and/or a congestion state of the memory system.

In some configurations the prefetch training circuitry is configured to store producer-consumer relationships each defining an association between a producer load indicator and a plurality of consumer load entries. The prefetch training circuitry may be coupled to prefetch generation circuitry operating as an indirect prefetcher. Indirect prefetchers generate prefetch requests based on the stored producer-consumer relationships and are particularly suited to some types of workload. The present techniques may be advantageously applied to indirect prefetchers which can require a lot of power for generating training data that may not be utilised or useful for a number of other types of workloads. Hence, by recognising that a particular workload is not one for which the indirect prefetcher will be beneficial, the control circuitry is able to switch the prefetch training circuitry to offline mode saving power and preventing the training data being corrupted whilst the processor is running a workload for which the indirect prefetcher will be beneficial.

In some configurations the memory accesses are load accesses. In other configurations, the memory accesses may be store accesses. The prefetch training circuitry may correspond to prefetch generation circuitry tailored for load accesses or store accesses. Alternatively, the prefetch training circuitry may correspond to prefetch generation circuitry tailored for both load and store accesses.

In some configurations the prefetch training circuitry generates the training data based on observation of every memory access performed by the processing circuitry. Alternatively, the prefetch training circuitry may utilise a sampling approach and sample every N-th memory access, where N is any integer greater than 1. It would be readily apparent to the person of ordinary skill in the art that alternative sampling approaches could be utilised.

Particular configurations will now be described with reference to the figures.

Figure 1:
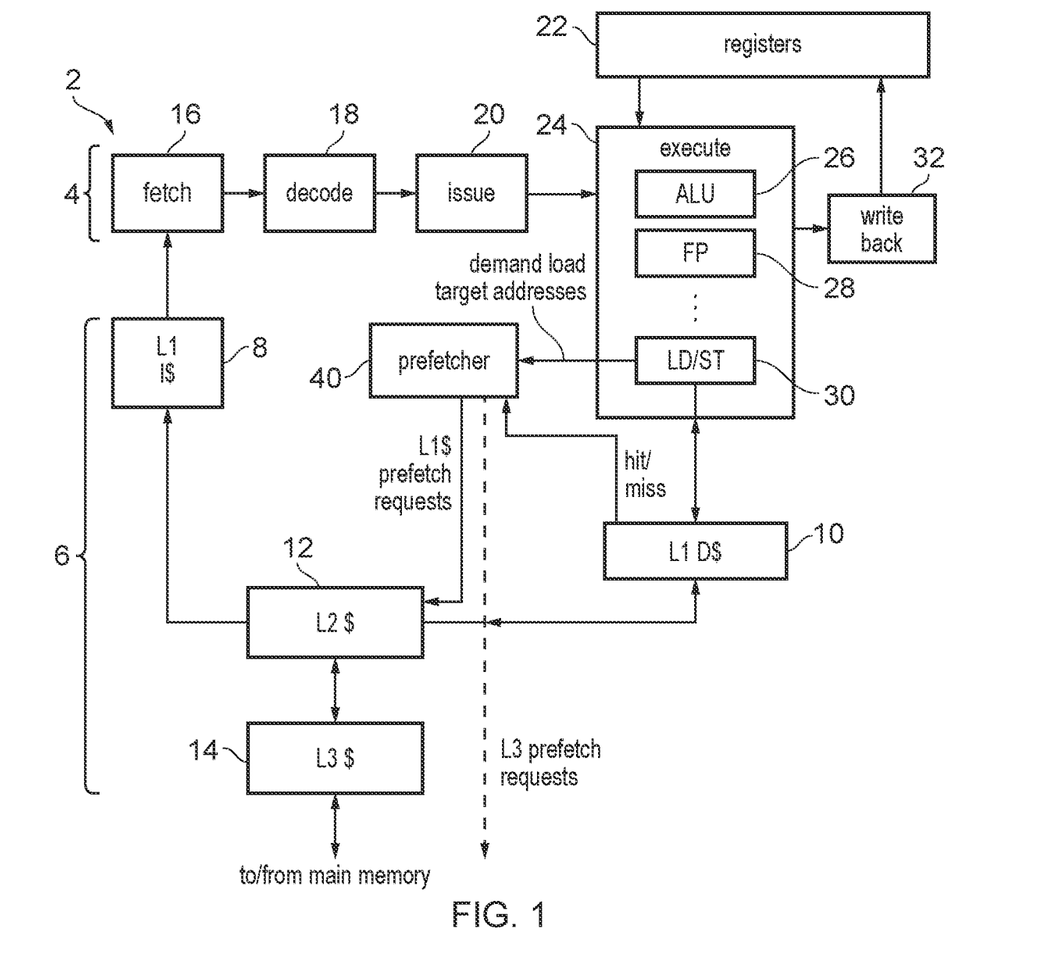
FIG. 1 schematically illustrates an apparatus according to some configurations of the present techniques.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 60 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analyzing patterns of demand target addresses specified by demand memory access requests issued by the load/store unit 30, and detecting stride sequences of addresses where there are a number of addresses separated at regular intervals of a constant stride value. The prefetcher 40 uses the detected stride address sequences to generate prefetch load requests which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example can also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However, it will be appreciated that the particular caches loaded based on the prefetch requests may vary depending on the particular circuit of implementation.

It would be readily apparent to the skilled person that a stride based prefetcher, such as the one described in relation to FIG. 1 is merely one example of a possible prefetcher. The prefetcher may, in some configurations, predict access patterns based on a producer-consumer relationship between two memory access instructions. The person of ordinary skill in the art would appreciate that the prefetch generation circuitry can be of any form and use any algorithm to generate the prefetch requests.

Figure 2:
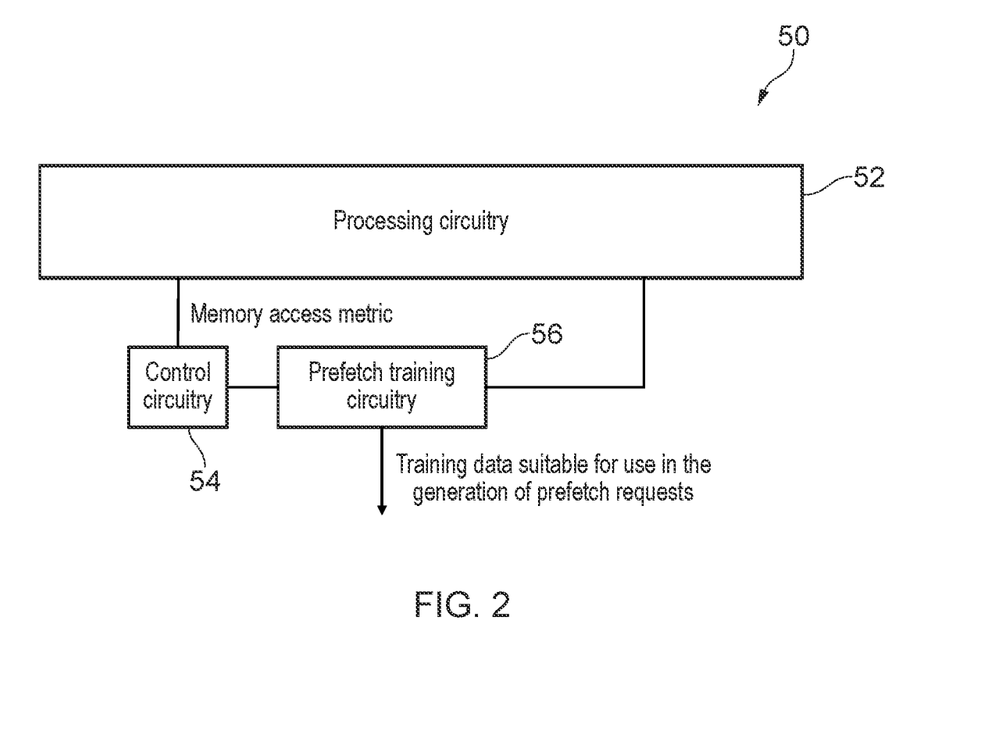
FIG. 2 schematically illustrates an apparatus according to some configurations of the present techniques.

FIG. 2 schematically illustrates an apparatus 50 according to some configurations of the present techniques. The apparatus comprises processing circuitry 52, control circuitry 54, and prefetch training circuitry 56. The processing circuitry 52 is configured to execute a stream of processing instructions and may be arranged, for example, in a same way as the execute stage 24 of FIG. 1. The prefetch training circuitry 56 receives information from the processing circuitry relating to memory access patterns of the processing circuitry and generates training data suitable to be used by prefetch generation circuitry to generate prefetch requests for data to be retrieved into local storage circuitry in anticipation of a demand request for that data issued by the processing circuitry. The prefetch training circuitry 56 is operable in at least one online mode in which it is able to generate training data and is operable in an offline mode in which it is unable to generate training data. The apparatus 50 is also provided with control circuitry 54 which is configured to determine a memory access metric and, based on that memory access metric, to switch the prefetch training circuitry 56 between the online mode and the offline mode.

Figure 3:
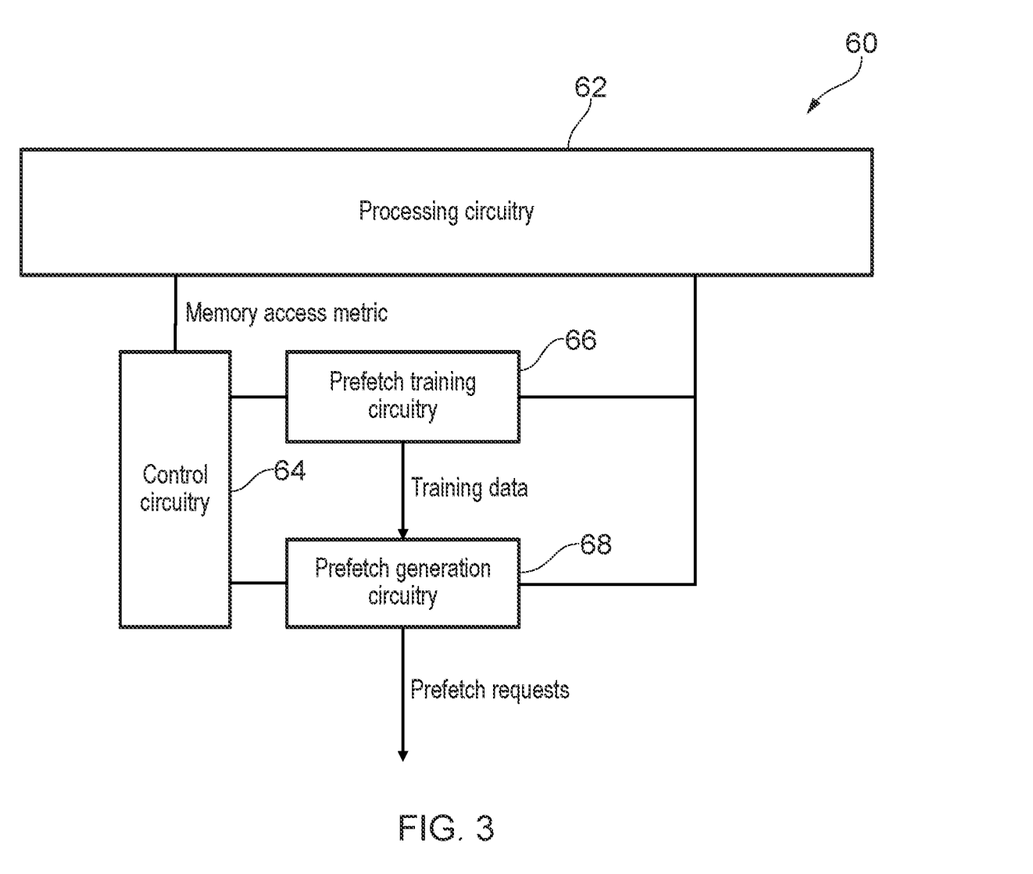
FIG. 3 schematically illustrates an apparatus according to some configurations of the present techniques.

FIG. 3 schematically illustrates an apparatus 60 according to some configurations of the present techniques. The apparatus comprises processing circuitry 62, control circuitry 64, prefetch training circuitry 62, and prefetch generation circuitry 68. The processing circuitry is configured to execute a stream of instructions and may be arranged, for example, in a same way as the execute stage 24 of FIG. 1. The prefetch training circuitry 66 receives information from the processing circuitry relating to memory access patterns of the processing circuitry and generates training data suitable to be used by the prefetch generation circuitry 68. The prefetch training circuitry is operable in at least one online mode in which it is able to generate training data and is operable in an offline mode in which it is unable to generate training data. The prefetch generation circuitry 68 generates prefetch requests based on observation of current access patterns of the processing circuitry 62 and training data supplied by the prefetch training circuitry 66. The prefetch generation circuitry 68 is operable in at least one online mode and is also operable in an offline mode in which the prefetch generation circuitry 68 is unable to generate prefetch requests. The control circuitry 64 is configured to switch the prefetch training circuitry 66 between the online mode and the offline mode based on determination of a memory access metric. The control circuitry 64 is also able to switch the prefetch generation circuitry 68 between the online mode and the offline mode. In particular, the control circuitry 64 is able to switch the prefetcher (comprising the prefetch training circuitry 66 and the prefetch generation circuitry 68) between at least three operational modes including: a fully online mode in which the prefetch training circuitry 66 is able to generate training data and the prefetch generation circuitry 68 is able to generate prefetch requests; a fully offline mode in which the prefetch training circuitry 66 is unable to generate training data and the prefetch generation circuitry 68 is unable to generate prefetch requests; and a training only mode in which the prefetch training circuitry 66 is able to generate training data but the prefetch generation circuitry is unable to generate prefetch requests. Switching to and from the fully offline mode is based on the memory access metric. However, switching between the fully online mode and the training only mode is based on a different metric, for example, a combination of a prefetch accuracy metric and a congestion metric.

Figure 4:
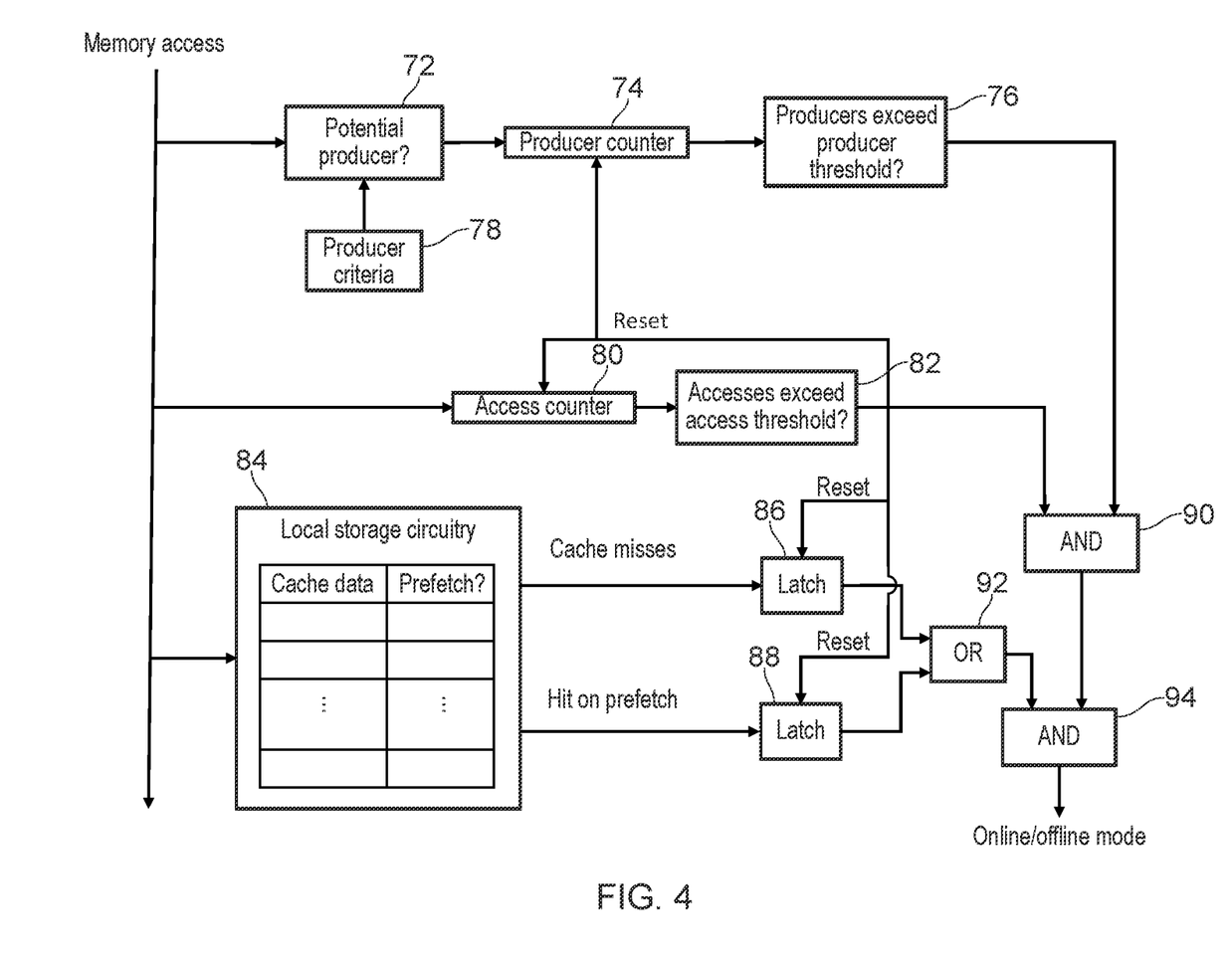
FIG. 4 schematically illustrates an apparatus according to some configurations of the present techniques.

FIG. 4 schematically illustrates further details of switching of the prefetch training circuitry between the online mode and the offline mode. The switching is controlled by control circuitry which comprises potential producer identifying circuitry 72 configured to identify whether a memory access is a potential producer based on producer criteria 78. The producer criteria may include a data size criterion which must be met for a memory access to be considered to be a potential producer. The producer criteria may also include an address format criterion requiring that retrieved data matches the address format criterion to be considered a potential producer. The control circuitry also comprises a producer counter 74 configured to retain a count of potential producer memory accesses. The producer count value stored by producer counter 74 is passed to comparison circuitry 76 which identifies whether or not the producer counter exceeds a producer threshold. If the comparison circuitry 76 determines that the producer counter 74 exceeds the producer threshold then a logical one is output to AND circuitry 90, otherwise a logical zero is output to AND circuitry 90. The control circuitry also comprises access counter 80 configured to count a number of memory accesses made.

The access counter 80 is incremented for each memory access. The value of the access counter 80 is passed to comparison circuitry 82 to compare whether the number of accesses stored in the access counter 80 exceeds an access threshold. If the comparison circuitry 82 determines that the value stored in the access counter 80 exceeds the access threshold, then a logical one is output. Alternatively, if the access counter 80 does not exceed the access threshold, then a logical zero is output. The output of the comparison circuitry 82 is passed to AND circuitry 90 and is also passed to the producer counter 74 and the access counter 80 to trigger both the producer counter 74 and the access counter 80 to reset. The output of signal from the comparison circuitry 82 is also passed to the cache miss latch 86 and the potential consumer latch 88 to trigger those latches to reset. The function of the cache miss latch 86 and the potential consumer latch 88 will be described below.

As discussed, the AND circuitry 90 receives a first input identifying whether the producer counter 74 exceeds the producer threshold, and a second input identifying whether the number of accesses has exceeded the access threshold. When both of these conditions are satisfied, the AND circuitry 90 outputs a logical one. Otherwise, the AND circuitry 90 outputs a logical zero. In this way, the output of AND circuitry 90 can be considered to take a value of logical one when, over a window of accesses having a size equal to the access threshold, the number of producers exceeds the producer threshold. In other words, the AND circuitry 90 outputs an indication that a predefined fraction of all accesses are potential producer accesses.

The control circuitry also monitors lookups in local storage circuitry 84. The local storage circuitry 84 stores cache data and an indication, for each item of cached data, whether that data was generated in response to a prefetch request or a demand request. The control circuitry monitors the local storage circuitry 84 for cache misses and for hits on prefetched data. If a cache miss is identified in response to a lookup in the local storage circuitry, then a signal is passed from the local storage circuitry 84 to latch circuitry 86. If a hit on prefetched data is identified in the local storage circuitry 84, then a signal is passed form the local storage circuitry to latch circuitry 88.

As discussed the latch circuitry 86 and the latch circuitry 88 are each reset in response to a signal indicating that the access counter 80 has exceeded an access threshold. The output of latch circuitry 86 identifies whether there has been a cache miss during the window of accesses having a size equal to the access threshold. The output of latch circuitry 88 identifies whether there has been a hit on a prefetched data item during the window of accesses having a size equal to the access threshold. The output of the latch circuitry 86 and the output of the latch circuitry 88 are passed to OR circuitry 92 which outputs a logical one if there has been either a cache miss during the window of accesses or if there has been a hit on the prefetched data during the window of accesses. The output of the OR circuitry 92 is combined with the output of AND circuitry 90 through AND circuitry 94 which outputs a value indicating whether the operational mode of the training circuitry should be switched to the offline mode or the online mode. The output indicating whether the training circuitry should be switched to the offline mode or to the online mode may be stored in a latch (not illustrated) with a value that is updated in response to the output of the comparison circuitry 82 to update the operational mode of the prefetch training circuitry once per window of accesses.

It would be readily apparent to the person of ordinary skill in the art that the circuit of FIG. 4 is provided for illustrative purpose only and that alternative metrics could be incorporated in the logical decision as to which mode is used based on the alternatives described above. The person of ordinary skill in the art would also recognise that, whilst the operation of the control circuitry has been described with reference to specific logical blocks, the circuitry may be laid out in any manner. For example, the circuitry may be laid out as described in reference to FIG. 4. Alternatively, two or more of the functional units may be combined into a single functional unit and/or one or more of the functional units may be separated into plural logic blocks that together provide the described function.

Figure 5:
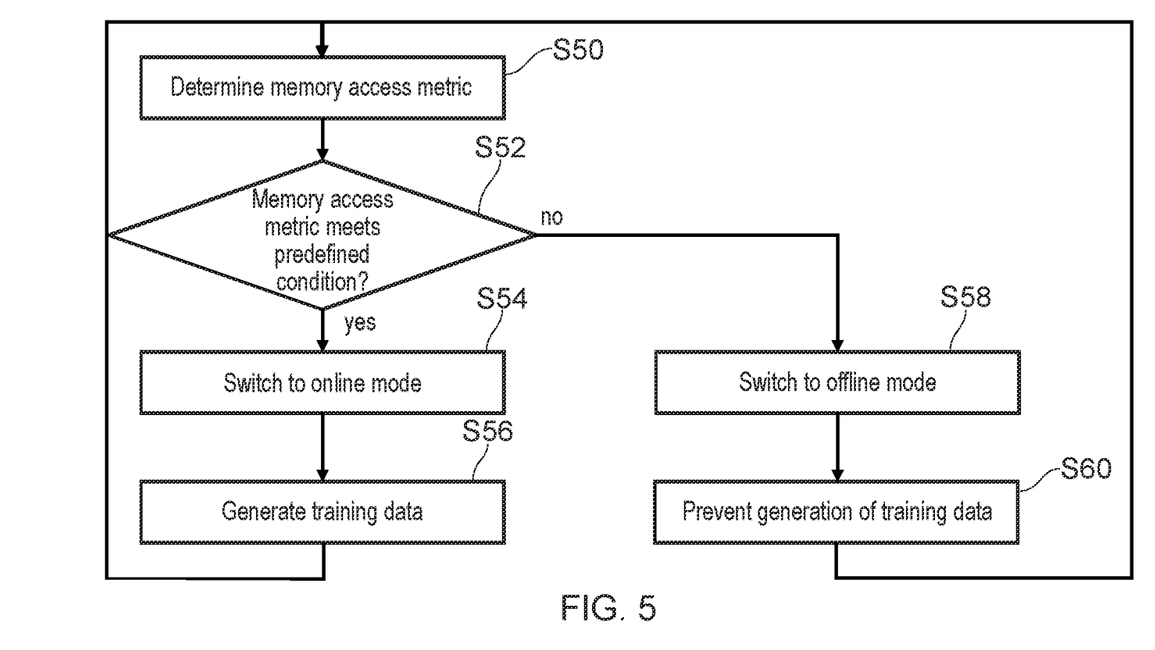
FIG. 5 schematically illustrates a sequence of steps carried out according to some configurations of the present techniques.

FIG. 5 schematically illustrates a sequence of steps carried out by the control circuitry in accordance with some configurations of the present techniques. Flow begins at step S50 where a memory access metric is determined. Flow then proceeds to step S52 where it is determined if the memory access metric meets a predefined condition. If, at step S52, it is determined that the memory access metric meets the predefined condition, then flow proceeds to step S54 where the operational mode of the prefetch training circuitry is switched to the online mode. Flow then proceeds to step S56 where the prefetch training circuitry generates prefetch training data before returning to step S50. If, at step S52, it was determined that the memory access metric does not meet the predefined condition, then flow proceeds to step S58 where the operational mode of the prefetch training circuitry is switched to the offline mode. Flow then proceeds to step S60 where the generation of training data is prevented before flow returns to step S50.

Figure 6:
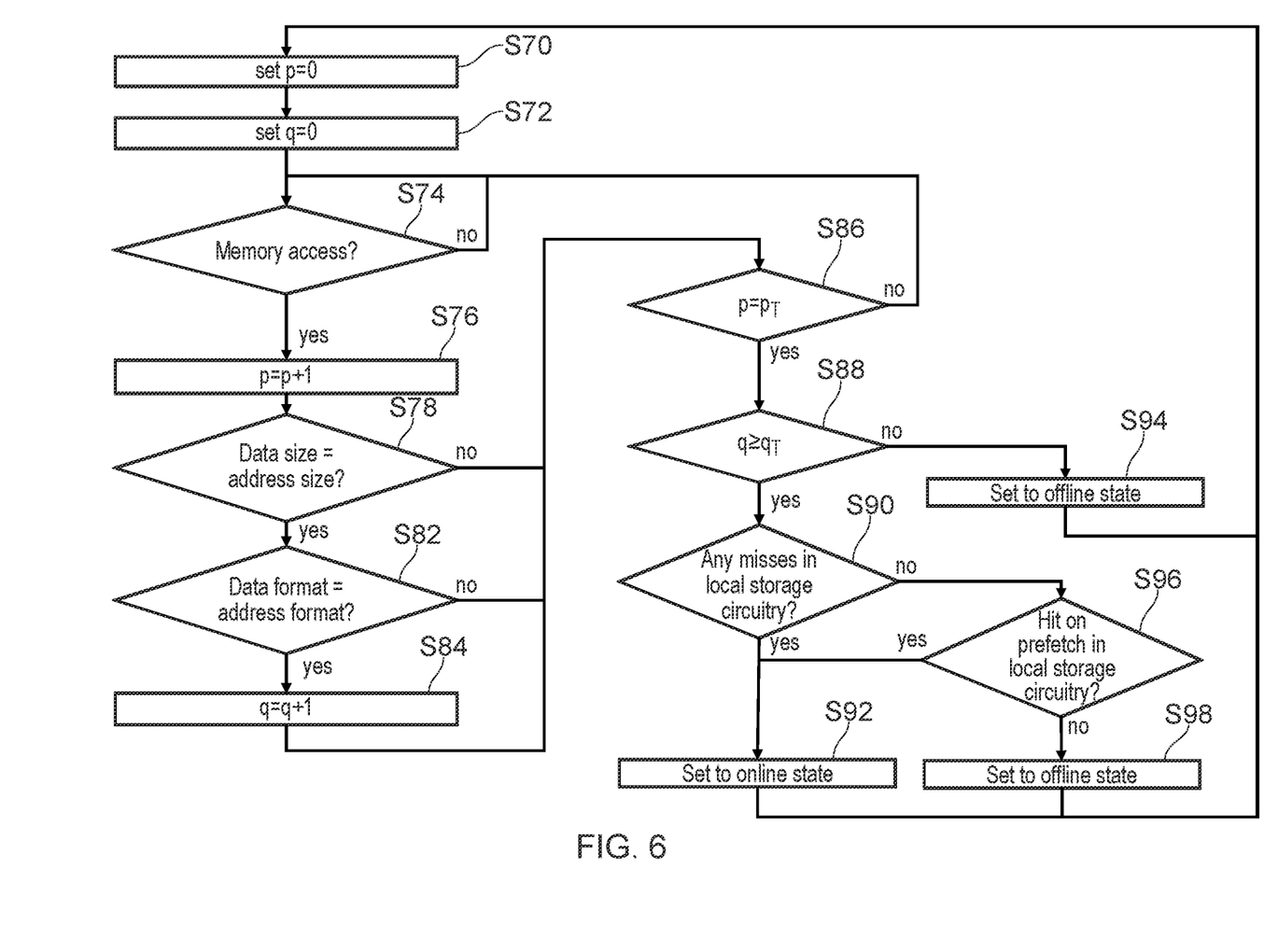
FIG. 6 schematically illustrates a sequence of steps carried out according to some configurations of the present techniques.

FIG. 6 schematically illustrates a sequence of steps carried out by the control circuitry in accordance with some configurations of the present techniques. Flow begins at step S70 where a variable p is set to 0 (p=0). The variable p is used to count memory accesses. Flow then proceeds to step S72 where a variable q is set to zero (q=0). The variable q is used to count potential producer memory accesses. Flow then proceeds to step S74 where it is determined if there has been a memory access. If, at step S74, it is determined that there has not been a memory access then flow remains at step S74. If, at step S74, it is determined that there has been a memory access to local storage circuitry, then flow proceeds to step S76 where p is incremented (p=p+1) before flow proceeds to step S78.

At step S78 it is determined if the data size of the memory access meets an address size criterion, i.e., if the size of the data is equal to the size of an address. If, at step S78, it is determined that the data size is not equal to the address size, then it is determined that the memory access is not a potential producer memory access and flow proceeds to step S86. If, at step S78, it was determined that the data size is equal to the address size, then it is determined that the memory access may be a potential producer and flow proceeds to step S82. At step S82, it is determined if the format of data returned from the memory access meets an address format criterion. If, at step S82, it is determined that the data format does not meet the address format criterion, then it is identified that the memory access is not a potential producer memory access and flow proceeds to step S86. If, at step S86 it is determined that the data format meets the address format criterion, then it is determined that the memory access is a potential producer memory access and flow proceeds to step S84 where q is incremented (q=q+1) to count the potential producer before flow proceeds to step S86.

At step S86, it is determined if p is equal to a threshold (p=$p_T$). If, at step S86, it is determined that p has not reached the threshold, then flow returns to step S74. If at step S86, it is determined that p has reached the threshold, i.e., an entire window of memory accesses as defined by the threshold $p_T$ has been observed, then flow proceeds to step S88. At step S88, it is determined if q is greater than the producer threshold $q_T$. If, at step S88, it is determined that q is not greater than the producer threshold $q_T$, then it is determined that in the window of memory accesses, the number of potential producers is not sufficient to meet the predefined criterion and flow proceeds to step S94 where the control circuitry triggers the prefetch training circuitry to transition to the offline state before flow returns to step S70.

If, at step S88, it was determined that q has reached (i.e., has met or exceeded) the producer threshold $q_T$, then flow proceeds to step S90. At step S90, it is determined if there have been any misses in the local storage circuitry since the memory access counter (p) was last reset. If, at step S90, it is determined that there have been no misses in the local storage circuitry since the memory access counter (p) was last reset, then flow proceeds to step S96. If, at step S90, it is determined that there have been one or more misses in the local storage circuitry since the memory access counter was last reset, then flow proceeds to step S92. At step S96, it is determined if there have been any hits on prefetches in the local storage circuitry since the memory access counter was last reset. If, at step S96, it is determined that there have been one or more hits on prefetches in the local storage circuitry since the memory access counter was last reset, then flow proceeds to step S92. If, at step S96, it is determined that there have not been any hits on prefetches in the local storage circuitry since the memory access counter was last reset, then flow proceeds to step S98. At step S92, the control circuitry triggers the prefetch training circuitry to switch to the online state before flow returns to step S70. At step S98 the control circuitry triggers the prefetch training circuitry to transition to the offline state before flow returns to step S70.

It would be readily apparent to the person of ordinary skill in the art that one or more of the steps of FIG. 6 could be performed in parallel, for example, the determinations at step S90 and step S96 could be performed in parallel and/or the counters p and q could be reset at steps S70 and S72 in parallel. Furthermore, one or more of the criteria set out in FIG. 6 could be omitted in some configurations. For example, in some configurations one or both of step S78 and step S82 could be omitted. Alternatively, or in addition, one or both of the determinations made in steps S90 and S96 could be omitted with the decision as to whether to transition to the offline state or the online state being dependent on the output of step S88 (i.e., with "yes" at step S88 feeding directly into step S92).

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
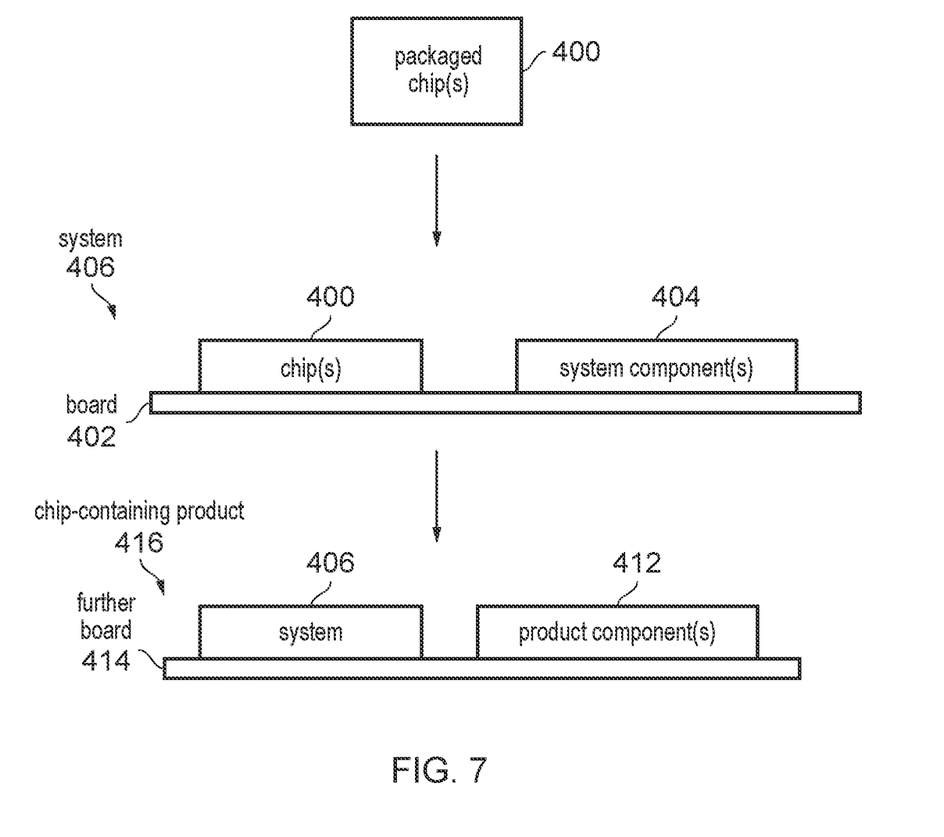
FIG. 7 schematically illustrates a system and a chip containing product according to some configurations of the present techniques.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, a system, a chip containing product, a method, and a medium. The apparatus comprises prefetch training circuitry to monitor memory access operations and generate training data based on the monitored memory access operations. The apparatus comprises control circuitry to determine an operational mode for the prefetch training circuitry from at least one online mode in which the prefetch training circuitry is configured to generate the training data and an offline mode in which the prefetch training circuitry is prevented from generating the training data. The control circuitry is configured to determine a memory access metric. The control circuitry is configured, when the memory access metric meets a predefined condition, to cause the prefetch training circuitry to operate in the online mode, and when the memory access metric does not meet the predefined condition, to cause the prefetch training circuitry to operate in the offline mode.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
prefetch training circuitry configured to monitor memory access operations and to generate training data based on the monitored memory access operations, wherein the training data is suitable to be used for generation of prefetch requests to prefetch data into local storage circuitry in advance of a demand request for the data by processing circuitry; and
control circuitry configured to determine an operational mode for the prefetch training circuitry from a plurality of operational modes comprising at least one online mode in which the prefetch training circuitry is configured to generate the training data and an offline mode in which the prefetch training circuitry is prevented from generating the training data,
wherein the control circuitry is configured:
to determine a memory access metric;
when the memory access metric meets a predefined condition, to cause the prefetch training circuitry to operate in the online mode; and
when the memory access metric does not meet the predefined condition, to cause the prefetch training circuitry to operate in the offline mode.

Clause 2. The apparatus of clause 1, wherein the memory access metric is dependent on a property of a memory access request other than a value of a target address of the memory access request.

Clause 3. The apparatus of clause 1 or clause 2, wherein the memory access metric depends on observation of at least one event occurring in the local storage circuitry.

Clause 4. The apparatus of clause 3, wherein the at least one event is observed in response to a lookup in the local storage circuitry.

Clause 5. The apparatus of clause 3 or clause 4, wherein the at least one event comprises at least one of:
a miss in response to a lookup in the local storage circuitry; and
a hit on prefetched data in response to the lookup in the local storage circuitry.

Clause 6. The apparatus of any preceding clause, wherein the memory access metric depends on embedded information in instructions executed by the processing circuitry.

Clause 7. The apparatus of clause 6, wherein the embedded information comprises an indication of a type of the instruction.

Clause 8. The apparatus of clause 7, wherein the indication of the type of the instruction is an indication of a potential producer instruction, wherein the potential producer instruction is a memory access instruction specifying data to be stored to the local storage circuitry satisfying one or more address criteria.

Clause 9. The apparatus of clause 8, wherein the one or more address criteria comprises a size criterion requiring a size of the data to be equal to the size of an address.

Clause 10. The apparatus of clause 8 or clause 9, wherein the one or more address criteria comprise criteria for a base address and/or criteria for a memory address.

Clause 11. The apparatus of any preceding clause, wherein the memory access metric is based on a format of data returned by one or more memory access instructions meeting an address format requirement.

Clause 12. The apparatus of any preceding clause, wherein the memory access metric is based on a number of occurrences of a type of memory access meeting a threshold.

Clause 13. The apparatus of clause 12, wherein:
the memory access metric is calculated over a fixed number of memory accesses; the control circuitry comprises an access counter configured to count a number of memory accesses, and an access type counter configured to count the number of occurrences of a type of memory access; and
the control circuitry is configured to determine if the potential producer access counter meets the threshold when the number of memory accesses is equal to the fixed number of memory accesses.

Clause 14. The apparatus of clause 12 or clause 13, wherein the threshold is hardwired into the control circuitry, and/or the control circuitry comprises a register configured to store the threshold and the control circuitry is responsive to one or more processing instructions to modify the threshold.

Clause 15. The apparatus of any preceding clause, comprising prefetch generation circuitry configured:
when the prefetch training circuitry is operating in the online mode, to generate the prefetch requests based on the training data; and
when the prefetch training circuitry is operating in the offline mode, to prevent the generation of the prefetch requests.

Clause 16. The apparatus of clause 15, wherein the plurality of operational modes comprises a training only mode in which the prefetch generation circuitry is prevented from generating the prefetch requests and the prefetch training circuitry is configured to generate the training data.

Clause 17. The apparatus of any preceding clause, wherein the prefetch training circuitry is configured to store producer-consumer relationships each defining an association between a producer load indicator and a plurality of consumer load entries.

Clause 18. The apparatus of any preceding clause, wherein the memory accesses are load accesses.

Clause 19. The apparatus of any preceding clause, wherein the prefetch training circuitry generates the training data based on observation of every memory access performed by the processing circuitry.

Clause 20. A system comprising:
the apparatus of any preceding clause, implemented in at least one packaged chip;
at least one system component; and
a board,
wherein the at least one packaged chip and the at least one system component are assembled on the board.

Clause 21. A chip-containing product comprising the system of clause 20 assembled on a further board with at least one other product component.

Clause 22. A method comprising:
with prefetch training circuitry. monitoring memory access operations and generating training data based on the monitored memory access operations, wherein the training data is suitable to be used for generation of prefetch requests to prefetch data into local storage circuitry in advance of a demand request for the data by processing circuitry; and
determining a memory access metric;
determining an operational mode for the prefetch training circuitry from a plurality of operational modes comprising at least one online mode in which the prefetch training circuitry is configured to generate the training data and an offline mode in which the prefetch training circuitry is prevented from generating the training data;
when the memory access metric meets a predefined condition, causing the prefetch training circuitry to operate in the online mode; and
when the memory access metric does not meet the predefined condition, causing the prefetch training circuitry to operate in the offline mode.

Clause 23. A non-transitory computer-readable medium to store computer-readable code for fabrication of the apparatus of any of clauses 1 to 21.

We claim:

1. An apparatus comprising:
prefetch training circuitry configured to monitor memory access operations and to generate training data based on the monitored memory access operations, wherein the training data is suitable to be used for generation of prefetch requests to prefetch data into local storage circuitry in advance of a demand request for the data by processing circuitry; and
control circuitry configured to determine an operational mode for the prefetch training circuitry from a plurality of operational modes comprising at least one online mode in which the prefetch training circuitry is configured to generate the training data and an offline mode in which the prefetch training circuitry is prevented from generating the training data,
wherein the control circuitry is configured:
to determine a memory access metric based on a number of occurrences of a type of memory access meeting a threshold, the threshold being greater than 1;
when the memory access metric meets a predefined condition, to cause the prefetch training circuitry to operate in the online mode;
when the memory access metric does not meet the predefined condition, to cause the prefetch training circuitry to operate in the offline mode; wherein:
the memory access metric is calculated over a fixed number of memory accesses;
the control circuitry comprises an access counter configured to count a number of memory accesses and a potential producer access type counter configured to count the number of occurrences of a type of memory access; and
the control circuitry is configured to determine if the potential producer access type counter meets the threshold when the number of memory accesses is equal to the fixed number of memory accesses.

2. The apparatus of claim 1, wherein the memory access metric is dependent on a property of a memory access request other than a value of a target address of the memory access request.

3. The apparatus of claim 1, wherein the memory access metric depends on observation of at least one event occurring in the local storage circuitry.

4. The apparatus of claim 3, wherein the at least one event is observed in response to a lookup in the local storage circuitry.

5. The apparatus of claim 3, wherein the at least one event comprises at least one of:
a miss in response to a lookup in the local storage circuitry; and
a hit on prefetched data in response to the lookup in the local storage circuitry.

6. The apparatus of claim 1, wherein the memory access metric depends on embedded information in instructions executed by the processing circuitry.

7. The apparatus of claim 6, wherein the embedded information comprises an indication of a type of the instruction.

8. The apparatus of claim 7, wherein the indication of the type of the instruction is an indication of a potential producer instruction, wherein the potential producer instruction is a memory access instruction specifying data to be stored to the local storage circuitry satisfying one or more address criteria.

9. The apparatus of claim 8, wherein the one or more address criteria comprises a size criterion requiring a size of the data to be equal to the size of an address.

10. The apparatus of claim 8, wherein the one or more address criteria comprise criteria for a base address and/or criteria for a memory address.

11. The apparatus of claim 1, wherein the memory access metric is based on a format of data returned by one or more memory access instructions meeting an address format requirement.

12. The apparatus of claim 1, wherein:
the threshold is hardwired into the control circuitry, and/or
the control circuitry comprises a register configured to store the threshold and the control circuitry is responsive to one or more processing instructions to modify the threshold.

13. The apparatus of claim 1, comprising prefetch generation circuitry configured:
when the prefetch training circuitry is operating in the online mode, to generate the prefetch requests based on the training data; and
when the prefetch training circuitry is operating in the offline mode, to prevent the generation of the prefetch requests.

14. The apparatus of claim 13, wherein the plurality of operational modes comprises a training only mode in which the prefetch generation circuitry is prevented from generating the prefetch requests and the prefetch training circuitry is configured to generate the training data.

15. A system comprising:
the apparatus of claim 1, implemented in at least one packaged chip;
at least one system component; and
a board,
wherein the at least one packaged chip and the at least one system component are assembled on the board.

16. A chip-containing product comprising the system of claim 15 assembled on a further board with at least one other product component.

17. A method comprising:
monitoring, with prefetch training circuitry, memory access operations and generating training data based on the monitored memory access operations, wherein the training data is suitable to be used for generation of prefetch requests to prefetch data into local storage circuitry in advance of a demand request for the data by processing circuitry; and
determining a memory access metric based on a number of occurrences of a type of memory access meeting a threshold, the threshold being greater than 1;
determining an operational mode for the prefetch training circuitry from a plurality of operational modes comprising at least one online mode in which the prefetch training circuitry is configured to generate the training data and an offline mode in which the prefetch training circuitry is prevented from generating the training data;
based on the memory access metric meeting a predefined condition, causing the prefetch training circuitry to operate in the online mode;
based on the memory access metric not meeting the predefined condition, causing the prefetch training circuitry to operate in the offline mode;
calculating the memory access metric over a fixed number of memory accesses;
counting a number of memory accesses in an access counter;
counting the number of occurrences of a type of memory access in a potential producer access type counter; and
determining if the potential producer access type counter meets the threshold when the number of memory accesses is equal to the fixed number of memory accesses.

18. A non-transitory computer-readable medium to store computer-readable code for fabrication of an apparatus comprising:
prefetch training circuitry configured to monitor memory access operations and to generate training data based on the monitored memory access operations, wherein the training data is suitable to be used for generation of prefetch requests to prefetch data into local storage circuitry in advance of a demand request for the data by processing circuitry; and
control circuitry configured to determine an operational mode for the prefetch training circuitry from a plurality of operational modes comprising at least one online mode in which the prefetch training circuitry is configured to generate the training data and an offline mode in which the prefetch training circuitry is prevented from generating the training data,
wherein the control circuitry is configured:
to determine a memory access metric based on a number of occurrences of a type of memory access meeting a threshold, the threshold being greater than 1;
when the memory access metric meets a predefined condition, to cause the prefetch training circuitry to operate in the online mode;
when the memory access metric does not meet the predefined condition, to cause the prefetch training circuitry to operate in the offline mode; wherein:
the memory access metric is calculated over a fixed number of memory accesses;
the control circuitry comprises an access counter configured to count a number of memory accesses and a potential producer access type counter configured to count the number of occurrences of a type of memory access; and
the control circuitry is configured to determine if the potential producer access type counter meets the threshold when the number of memory accesses is equal to the fixed number of memory accesses.

* * * * *